Sept. 2, 1930.    E. W. OSTRANDER    1,774,839
BRICK CRATE
Filed July 13, 1928    2 Sheets-Sheet 1
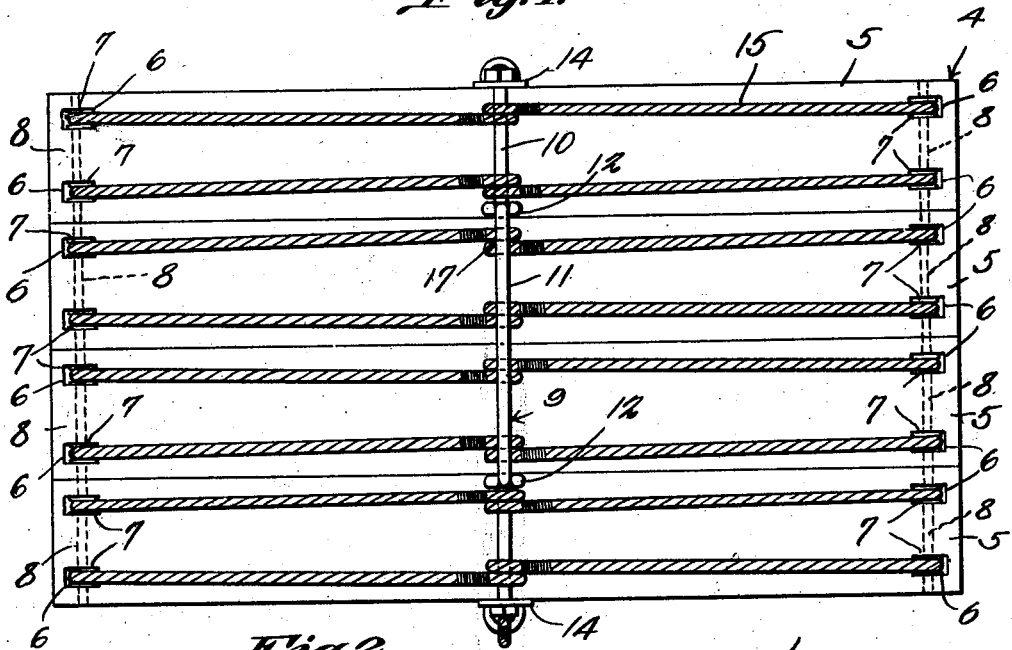
E. W. Ostrander, Inventor
By C. A. Snow & Co.
Attorneys Sept. 2, 1930.   E. W. OSTRANDER   1,774,839
BRICK CRATE
Filed July 13, 1928   2 Sheets-Sheet 2
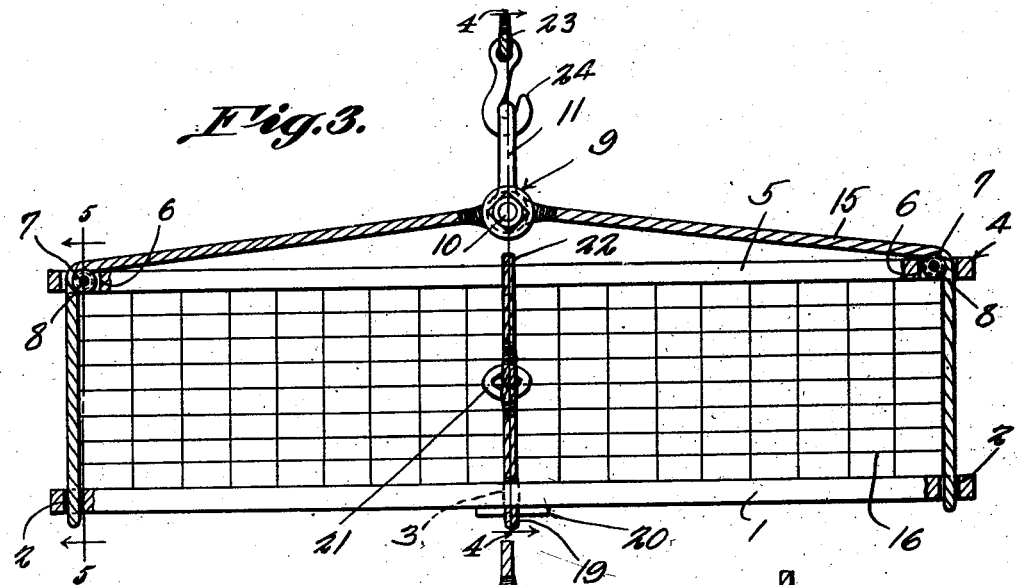
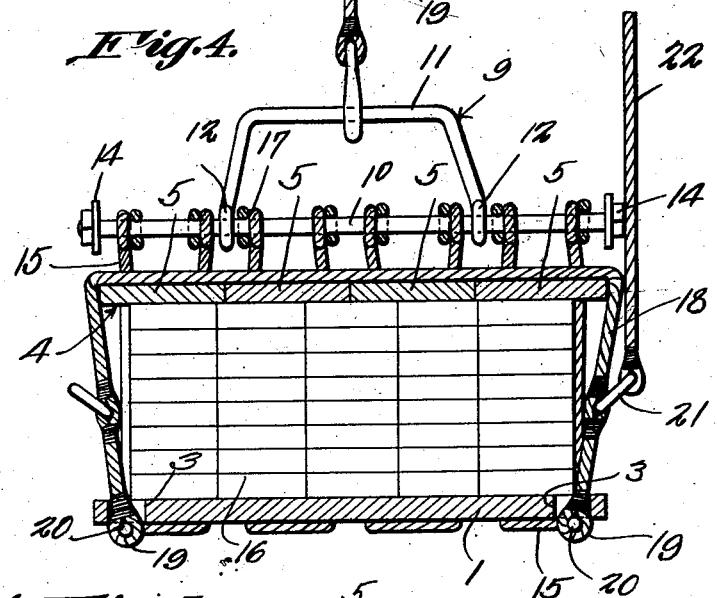
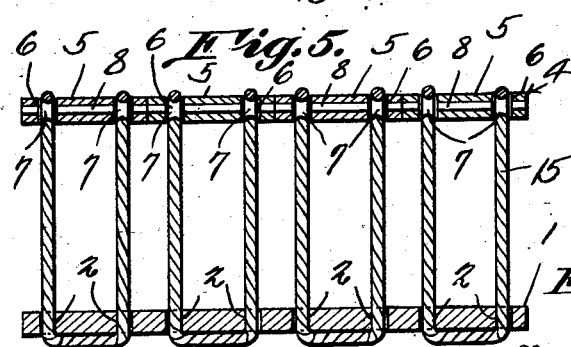
E. W. Ostrander  Inventor Patented Sept. 2, 1930

1,774,839

UNITED STATES PATENT OFFICE

EDWARD W. OSTRANDER, OF COEYMANS, NEW YORK

BRICK CRATE

Application filed July 13, 1928. Serial No. 292,562.

This invention aims to provide a simple means whereby a large number of bricks or other objects of a similar sort may be stacked up, hoisted and transferred to the place of delivery, and there dumped.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in top plan, a device constructed in accordance with the invention;

Figure 2 is a bottom plan;

Figure 3 is a side elevation wherein parts are broken away;

Figure 4 is a cross section on the line 4—4 of Figure 3;

Figure 5 is a cross section on the line 5—5 of Figure 3.

In carrying out the invention, there is provided a rigid base 1, in the form of a plate, it being understood that any desired material may be used in the making of the base, and in the making of all other parts hereinafter described, either wood or metal, or any other material of construction being employed, as the manufacturer may wish. The base 1 is provided near to its ends with openings 2. The base 1 is supplied intermediate its ends, and near to its longitudinal edges, with openings 3, seen most clearly in Figure 4 of the drawings, and indicated, as to position, in Figure 2.

The top of the crate is designated generally by the numeral 4. Preferably the top 4 is made up of a plurality of slats 5 located side by side, as shown in Figure 1. The slats 5 are supplied at their ends with openings 6, in which are located antifriction devices, such as pulleys 7. It may be found convenient to run rods 8 through the slats 5, there being one rod for each end of each slat, the pulleys 7 being journalled on the rods 8.

The numeral 9 designates, generally, a suspension member including an inverted U-shaped bail 11, shown in Figure 4, and having eyes 12 through which extends a foot, preferably in the form of a rigid rod 10, the bail 11 being mounted to swing on the rod 10, through the instrumentality of the eyes 12. The rod 10 is supplied at its ends with removable heads 14, which may be nuts and washers.

The device includes a plurality of flexible elements which are U-shaped, as shown in Figure 5. The flexible elements are marked by the numeral 15. They extend tranversely of the base 1, along the lower surface of the base and up through the openings 2. The flexible elements 15 extend up through the openings 6 in the slats 5, and over the pulleys 7. Thence, the ends of the flexible elements 15 are extended upwardly above the top 4.

The flexible elements 15 are supplied at their upper ends with eyes 17 detachably mounted on the rod 10. The bricks or other objects which are located between the top 4 and the base 1 are marked by the numeral 16. The arms of each flexible element 15 (Figure 5) are located close enough together so that they will extend upwardly along each vertical row of bricks 16 on the base 1. This is indicated in Figure 4 of the drawings. Because the bricks of each row are retained at each end of the crate by two strands, as above described, it will be impossible for the bricks to escape endwise from the crate. The numeral 23 indicates a hoisting cable having a hook 24 or other suitable appliance for engagement with the bail 11.

A cross line 18 extends transversely of the top 4 and downwardly through the openings 3 in the base 1. At its lower end, the cross line 18 has eyes 19 in which are inserted securing elements 20, such as pins, the pins engaging the lower surface of the base 1. The sides of the cross lines 18 are equipped with rings 21 or other suitable elements, to which may be connected a dump line 22. When the bricks are stacked up in place, as shown in Figure 3, and when the crate is hoisted by means of the cable 23, the flexible elements 15 tend to run over the antifriction pulleys 7 a little.

Thus the slats 5 are forced down on top of the bricks 16, the bricks thus being bound securely between the slats and the base 1.

If the dump line 22 is held taut, and the hoisting cable 23 is slacked away, the flexible elements 15 will be loosened, and the slats 5 will be loosened, the crate swinging down into a vertical position from the position shown in Figure 4 of the drawings. When this operation takes place, the bricks 16 will slide readily out of the crate.

What is claimed is:

1. In a crate of the class described, a base, a top disposed above the base, antifriction devices carried by the top, flexible elements fixed to the base and extended upwardly above the top in contact with the antifriction devices, and a suspension member connected to the flexible elements and located above the top, whereby when the crate is suspended, the flexible elements will move over the antifriction devices and tend to force the top downwardly and cause the material in the crate to be pressed between the top and the base.

2. In a brick crate of the class described, a base, and mechanism for holding all of the bricks with a light but distributed pressure, said mechanism comprising a top disposed above the base and including a plurality of slats located side by side, flexible elements connected to the base and extended upwardly above the top, there being at least one flexible element at each end of each slat, the flexible elements being in slidable contact with the slats at points near to the ends of the slats and a suspension member connected to the flexible elements, and located above the slats, whereby when the crate is suspended, the flexible elements will tend to force the slats downwardly and cause the material in the crate to be pressed between the top and the base.

3. In a crate of the class described, a base, a top disposed above the base and comprising a plurality of slats located side by side, flexible elements looped through the base and having their ends extended upwardly through the slats and provided with eyes, a rod engaged through the eyes, lifting means connected to the rod, a cross line connected at its ends to the base and extended transversely of the top, and a dump line connected to the cross line at one side of the crate.

In testimony that I claim the foregoing as my own, I have hereto affixed my signature.

EDWARD W. OSTRANDER.